ACOUSTICAL TRAVELING WAVE PARAMETRIC AMPLIFIER AND GENERATOR
USING PARAMAGNETIC IONS TO ENHANCE ACOUSTIC DISPERSION
Filed Aug. 26, 1963 2 Sheets-Sheet 1

INVENTORS
NORMAN S. SHIREN
THOMAS G. KAZYAKA

BY [signature]
ATTORNEY

1

3,215,943

ACOUSTICAL TRAVELING WAVE PARAMETRIC AMPLIFIER AND GENERATOR USING PARAMAGNETIC IONS TO ENHANCE ACOUSTIC DISPERSION

Norman S. Shiren, Mount Kisco, and Thomas G. Kazyaka, Mohegan Lake, N.Y., assignors to International Business Machines Corporation, New York, N.Y., a corporation of New York Filed Aug. 26, 1963, Ser. No. 304,525
10 Claims. (Cl. 330—4.6)

This invention relates to parametric devices in general and more particularly, to parametric amplifiers of acoustical energy.

It is known that the propagation velocity of a sound wave is dependent upon the density of the material through which such wave passes, so that when there is a density variation of the material, there will be variation in the velocity of the sound passing through such material. In general, these variations are not significant. However, one may employ such variations of wave propagation velocity in an elastic medium to produce a wave amplifier. It is based on the recognition that these variations become significant when the amplitude of a traveling compression or shear wave is large and the relationship $$c^2 = \frac{u}{\rho}$$

is non-linear as to amplitude, wherein $c$ is the velocity of wave propagation, $u$ is the shear modulus of the material through which the wave propagates, and $\rho$ is the density of the material. The present invention is based on an interaction that takes place within an elastic medium (and relies on this non-linearity) between two or more traveling elastic waves. The two components comprise a pump frequency P and a signal frequency Q, P being normally, though not necessarily, greater than Q and form a modulation product, in the elastic medium, of the difference frequency $P—Q$; the latter is regenerative with respect to the signal frequency, so that the signal wave grows as it travels, such growth being an example of parametric amplification.

The parametric gain achieved is offset, however, by non-dissipative losses that are attributed to the transfer of energy from the signal wave Q to a sum frequency $(P+Q)$ modulation product of the pump wave with the signal wave. It is advantageous, therefore, either to balance out the effects of such undesired modulation products or to suppress them.

The present invention seeks to obtain a parametric amplifier for acoustic waves by employing the principle of selective dispersion for elastic wave propagation in a solid. The principal means for obtaining such selective dispersion is the use of paramagnetic ions in a host crystal, the latter being also a non-linear acoustic propagation medium for parametric devices. MgO has been found to have certain non-linear characteristics, to be discussed in greater detail hereinafter, which make it very suitable as a solid medium that can support non-linear interactions for collinear acoustic waves.

It is also desirous of using MgO as a host crystal for paramagnetic ions having large spin-phonon interactions or strong ultrasonic paramagnetic resonance transitions. A variable D.C. magnetic field can be applied to the host

2 crystal in which such paramagnetic ions are imbedded. The ions have a strong resonance interaction with the ultrasonic waves and alter the normally low acoustic dispersion of the MgO. The variable D.C. magnetic field adjusts the paramagnetic dispersion in order to suppress the undesired modulation products. By judicious selection of input frequencies and ions in the host crystal, one obtains different output frequencies.

Additionally, when investigating the non-linear acoustic interactions taking place in a host crystal such as MgO, it is desirable to apply two separate waves, generally of different frequencies, to the host crystal. In the prior art, two separate transducers are bonded to each end of the crystal and two separate ultrasonic waves are applied to the transducers. Such structure is described in an article entitled, "Non-linear Acoustic Excitation in GaAs," by R. J. Mahler et al., which appeared in "The Physical Review Letters" of May 1, 1963, vol. 10, No. 9, pages 395–397. The present invention relies on a novel structure for investigating such non-linear acoustic interactions in the host crystal by employing only a single transducer and, hence, only one bond between the transducer and host crystal, yet permits one to apply two separate waves to the non-linear crystal.

The novel structure employs a quartz bar that is suspended between two microwave cavity resonators. One end of the bar is bonded to the non-linear MgO crystal. The cavity resonator at the free end of the quartz generates sound waves in the microwave region. In addition, an acoustic wave is generated at the bonded end of the quartz rod in a non-reentrant cavity resonator. The use of a non-reentrant resonator allows the bonded crystal to pass through the cavity so that the end of the quartz bar can be in the microwave electric field of the cavity. Such configuration avoids the use of double acoustic bonds.

An object of the present invention is to provide a parametric amplifier for acoustical waves.

A further object is to provide a novel non-linear crystal for use in a parametric device for acoustical waves.

A further object is to employ paramagnetic ions in such non-linear crystal as a means of obtaining acoustic dispersion.

Yet another object is to employ such novel host crystal in a double resonant cavity so as to reduce the number of elements needed to create a parametric amplifier of acoustical waves.

The foregoing and other objects, features and advantages of the invention will be apparent from the following more particular description of preferred embodiments of the invention as illustrated in the accompanying drawings.

Figures 1, 2:
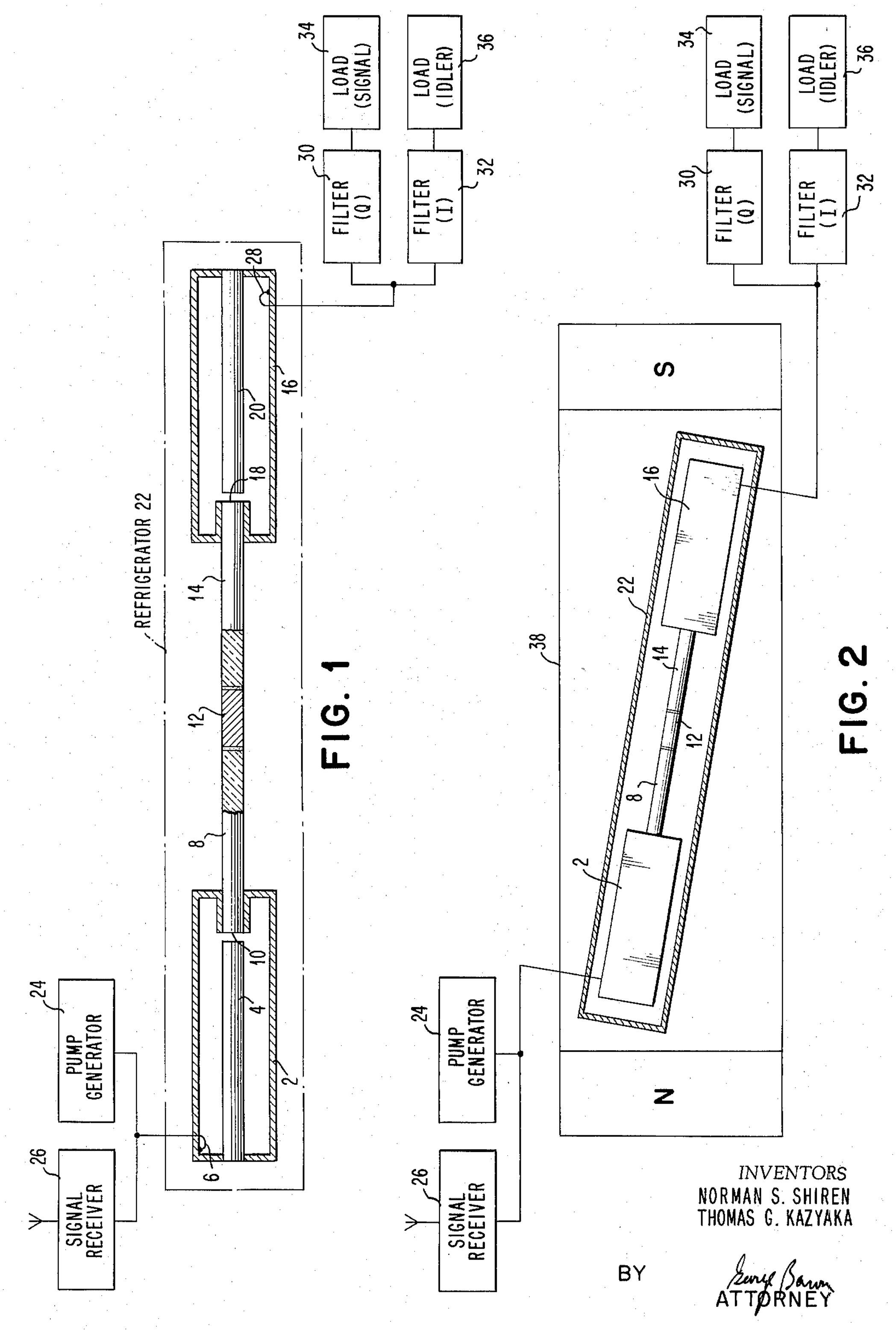
FIG. 1 is a first embodiment of the invention employing MgO as the non-linear crystal.
FIG. 2 is a second embodiment of the invention using a magnet and paramagnetic ions in a host crystal.

In FIGURE 1 is seen an embodiment of the invention employing a MgO crystal whose non-linear characteristics, with respect to acoustical energy propagation through the crystal, can be exploited to obtain amplification of an acoustical signal. A coaxial resonator 2 includes an inner conductor or metal stub 4 and a coupling loop 6 for launching energy into the resonator 2. A quartz rod 8 has one face 10 abutting the unsupported end of conductor stub 4 and its other face cemented to a face of a MgO crystal 12. The other face of the MgO crystal is cemented to a second quartz rod 14, the latter in turn being supported on one end of an output cavity resonator 16. The quartz rod 14 has its uncemented end 18 abutting against the unsupported end of the inner conductor 20 of cavity resonator 16. The entire assembly comprising the two resonators 2 and 16 and quartz tubes 8 and 14 and MgO crystal 12 are kept in a refrigerator 22 so as to maintain the system at a temperature of 20° K. or less.

A pump wave having a frequency P is injected into cavity resonator 2 from pump generator 24 via loop 6 and a signal to be amplified having a frequency Q is simultaneously launched from a signal generating source 26. The parameters of the cavity resonator 2, frequency P of the pump signal and frequency Q of the signal to be amplified, and the electric field between the end face of conductor 4 and face 10 of quartz rod 8 are chosen so that during the course of travel of the composite wave $P \pm Q$ along the rod 8, interactions take place between the components of the composite wave in the MgO crystal. As is known in the art (see Patent No. 3,012,204 to Dransfeld et al., issued December 5, 1961, for a detailed discussion of the principles involved), interactions between the pump wave P and signal wave Q take place by virtue of the non-linear characteristics of the medium through which P and Q travel. In FIGURE 1, MgO is the medium wherein the various harmonics and modulation products are generated, such generated frequencies being represented as $nP \pm mQ$ where $m$ and $n$ are integers. The interaction of each difference frequency modulation product with the corresponding harmonic of the pump frequency being regenerative with respect to the signal Q. A coupling loop 28 serves to withdraw the amplified signal Q from the cavity resonator 16 and suitable filters 30 and 32 separate the amplified signal Q from the difference frequency $P-Q$. The amplified signal Q goes to a suitable load 34 and the difference frequency can be sent to a second load 36. The pump wave P is reflected back from the output end of rod 20 to the input end 10 for reuse.

The MgO crystal was selected as a non-linear acoustic propagation medium for parametric devices of the type set forth in the aforementioned Dransfeld et al. patent because such crystal was found to have a large anharmonic potential energy term for compressional strains on cubic axes. Strong interactions between longitudinal waves propagating on these cubic axes were observed. Generation of harmonics and some frequencies up to at least four times the input frequencies is also attainable. Not only is this non-linear property desirable, but dispersion in the crystal is sufficiently small so that collinear longitudinal interactions are allowed. It is also noticed that about 40% of the input acoustic power applied to quartz rod 8 by way of the resonator 2 is converted to harmonics, when the input strain amplitude of the crystal 12 is of the order of $10^{-6}$. Thus MgO appears to be an ideal material for use in acoustic parametric devices.

Turning to FIGURE 2, there is shown a second embodiment of the invention wherein the MgO crystal 12 serves as a host crystal for paramagnetic ions. Representative paramagnetic ions are $Fe^{2+}$, $Ni^{2+}$. Since the latter have strong spin-phonon interactions, they have been found to be suitable paramagnetic ions that can be carried by the host crystal 12. In general, suitable ions will be those with an even number of electrons and with orbitally degenerate ground states or orbital singlets having small crystal field splittings and large spin-orbit interactions. Among the transition elements would be ions having an electron configuration of $d^2$, $d^4$, $d^6$, $d^8$. Among the rare earth ions, $H_0^{3+}$ has large spin-phonon interactions and $U^{4+}$ is also deemed appropriate as a paramagnetic ion to be carried by the host crystal.

In operating the embodiment of FIGURE 2, a D.C. magnet 38 surrounds the host crystal 12 with the paramagnetic ions imbedded in the MgO. When a traveling elastic wave of pump frequency P and signal frequency Q are applied to the left face of crystal 12 via the quartz rod 8, adjusting the D.C. field applied to crystal 12 by magnet 38 will cause the output from crystal 12 to be limited to the input frequencies P and Q and the idler frequency $P-Q$. In the embodiment of FIGURE 2, one uses the paramagnetic ions in conjunction with a variable D.C. magnetic field to provide resonance dispersions at frequencies controllable by such magnetic field. The strength of the interaction of the frequencies P and Q, as well as the sums and differences within the single crystal MgO, is varied by adjusting the angle of the applied magnetic field with respect to the wave propagation direction. Either the crystal and its housing are fixed and the magnet 38 is rotated, or vice versa. Thus, the amount of dispersion may be varied within a single crystal. The embodiment of FIGURE 2 can be used in acoustic parametric devices where the addition of dispersion into the system is needed to make a given interaction possible or to remove an undesired interaction.

Figure 3:
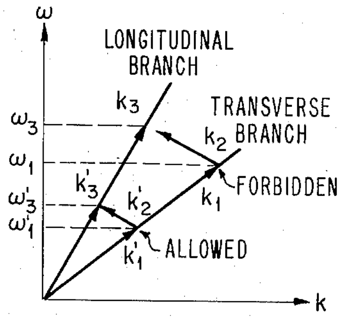
FIGS. 3 and 4 are plots of $\omega$ v. $k$ as aids in understanding the invention.

In parametric or non-linear interactions between acoustical waves, there is a conservation of energy and momentum. Energy is represented by the symbol $\omega$ and momentum by the symbol $\vec{k}$. Then, the relationship $\omega_1+\omega_2$ should equal $\omega_3$ and $\vec{k}_1+\vec{k}_2$ should equal $\vec{k}_3$. In a dispersive medium such as the MgO crystal 12 with paramagnetic ions imbedded therein, the above equation can only be satisfied for selected frequency, polarization, and direction combinations. For example, as seen in FIGURE 3, the $\omega$-$k$ diagram shows, for collinear interactions, an allowed and a forbidden interaction of two transverse acoustic waves; $\omega'_1$, $k'_1$ and $\omega'_2$, $k'_2$ form a longitudinal allowed wave $\omega'_3$, $k'_3$. A forbidden interaction in which $\omega_1 k_1$, $\omega_2 k_2$, $\omega_3 k_3$, do not satisfy the above conservation relations is also shown. A paramagnetic impurity having a strong resonance interaction with the ultrasonic $\omega_1$, $k_1$ and $\omega_2$, $k_2$ or $\omega_3$, $k_3$ will alter the normal acoustic dispersion of the solid propagation medium such as MgO about a small range of frequencies near the resonance frequency. However, the resonance frequency may be controlled by an applied magnetic field according to the formula $\omega_r=\gamma H$ where H is the magnetic field strength and $\gamma$ the gyromagnetic ratio for the particular ion serving as a paramagnetic impurity.

Figure 4:
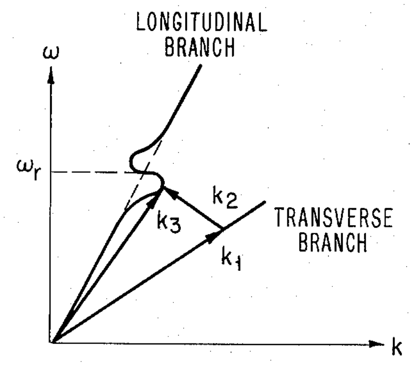

For example, in cubic crystals and for waves propagating on <100> axes, the interaction strength is proportional to the angle of the magnetic field with respect to such propagation direction. In FIGURE 4 there is a plot of $\omega$-$k$ to show how the dispersion of the longitudinal branch may be altered so that the forbidden interaction of the previous example becomes an allowed interaction. $\omega_r$, in FIGURE 4, is the paramagnetic resonance frequency that is controllable by the applied magnetic field. By changing this frequency, thereby changing the resonance dispersion, one may obtain this alteration. In a sense, the optical analog of this aspect of applicant's invention is termed "index-matching" and "index-mismatching."

Figure 5:
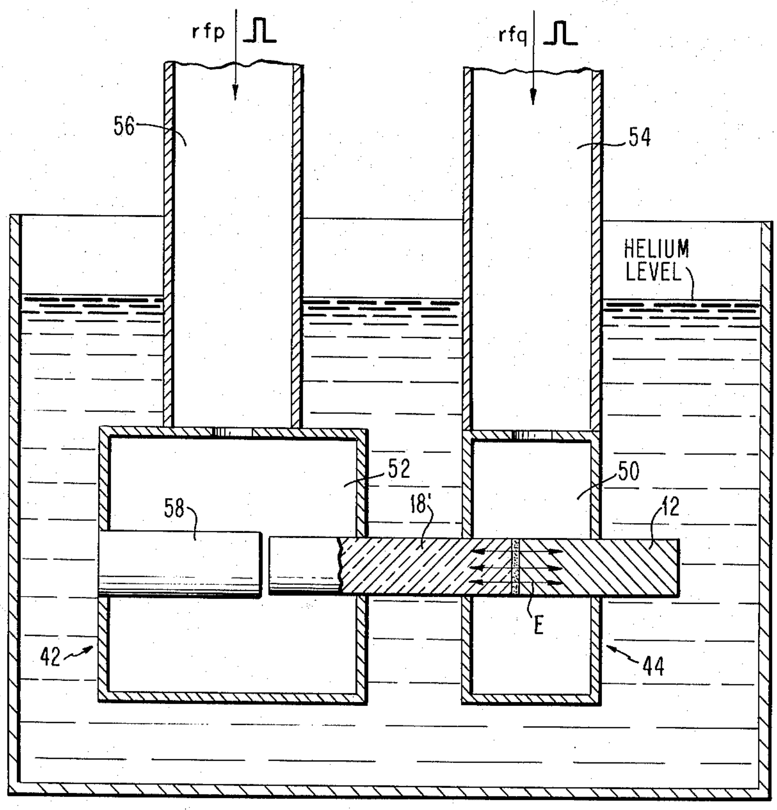
FIG. 5 is a third embodiment of the invention employing a single bonded crystal.

Turning to FIGURE 5, there is shown that embodiment of the invention wherein two separate ultrasonic waves may impinge upon a non-linear acoustic propagation medium without the need to have the two bonds between the crystal 12 and the quartz rods 8 and 14 as shown in FIGURE 1 of applicant's drawing. In the arrangement shown in FIGURE 5, a single transducer is employed to produce two separate waves of different frequencies in the non-linear crystal 12. As is shown therein, a quartz bar 18' is bonded to the host crystal 12 at one face of the crystal 12. The cavity resonator 42 is a conventional re-entrant resonator used in the generation of microwave ultrasonics. The portion of the quartz transducer 18' that is bonded to the non-linear crystal 12 is placed within a conventional non-reentrant cavity resonator 44. FIGURE 5 teaches how a non-linear crystal can be employed for studying its affect upon acoustical waves in the microwave region using only a single bonded surface instead of the usual double bonded surface. MgO crystal 12 is bonded to the quartz transducer 18' and the bonded portion is placed in a rectangular cavity resonator portion 50. The unbonded surface of the quartz transducer 18' is placed in the reentrant cavity resonator portion 52. A radio frequency pulse $rf_q$ is applied at time $t_1$ to the wave guide 54 that carries energy into the resonating cavity 50. Such pulse of energy is converted by the quartz transducer 18' into acoustical energy which travels towards the left through such transducer 18'. A second *rf* pulse, namely, $rf_p$, is sent through wave guide 56, such $rf_p$ pulse being timed so that it enters cavity 52 when the acoustical wave initiated by $rf_q$ has reached the left-most surface of transducer 18', that surface which abuts conductor 58 of the cavity resonator 52.

The $rf_p$ pulse is converted by the quartz transducer 8 into acoustical energy and two sound waves now proceed to travel to the right within transducer 18'. The two sound waves interact non-linearly in the MgO crystal so that sums and differences of the two sound waves are generated within the crystal. These newly created or generated frequencies create an electrical field E, the latter being sensed by any suitable means, such as additional resonance modes within the cavity resonator 50. It is understood that the detection means do not form part of this invention and are not set forth in any detail. Since the pulse times for the radio frequency pulses $rf_q$ and $rf_p$ are about a half a microsecond and the travel time of the acoustical waves through the quartz transducer 18' and the MgO crystal 12 is about 5 microseconds, one can readily control the radio frequency pulses so that they do not enter their respective wave guides until the acoustical waves, created by a previous *rf* pulse, have dissipated within the quartz transducer 18' and MgO crystal 12. Thus, the configuration in FIGURE 4 avoids the need for a second bond for attaching the MgO crystal to a quartz transducer. Since bondings are dissipating surfaces and must be carefully made to assure good experimental results, the elimination of one of the bonds simplifies the procedure for studying large non-linear acoustic wave interactions.

In one example of a parametric device built in accordance with the teachings of this invention, rod 18' was an X-cut quartz cylinder 1.75 cm. long and 3 mm. in diameter whereas the MgO crystal had the same diameter but was about 1 cm. in length. A resin was used to adhere the MgO crystal to the quartz rod 18', such resin being manufactured by the General Electric Company and identified as G. E. 7031 resin. The pump frequency $rf_p$ was 9.238 gc./sec. and the signal frequency $rf_q$ was 9.132 gc./sec. Generated modulation products were observed at the frequencies $rf_q+rf_p$, $rf_p+2rf_q$, $rf_p+3rf_q$.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A wave amplifier comprising a first transducer capable of converting electromagnetic energy into acoustical energy, a second transducer also capable of converting electromagnetic energy into acoustical energy, a non-linear acoustic propagating medium interposed between said two transducers so that all three elements form a continuous medium for the passage of acoustical energy therethrough, paramagnetic ions incorporated in said non-linear acoustic propagating medium, means for launching an electromagnetic wave to supply pump frequency energy to said first transducer, means for launching an electromagnetic wave to supply signal frequency energy to said first transducer whereby both waves impinge upon said first transducer to create acoustical waves that impinge upon said non-linear acoustic propagating medium, and means for applying a magnetic field to the paramagnetic ions in said non-linear acoustic propagating medium.

2. A wave amplifier comprising a first transducer capable of converting electromagnetic energy into acoustical energy, a second transducer also capable of converting electromagnetic energy into acoustical energy, a magnesium oxide crystal interposed between said two transducers so that all three elements form a continuous medium for the passage of acoustical energy therethrough, paramagnetic ions incorporated in said magnesium oxide crystal, means for launching an electromagnetic wave to supply pump frequency energy to said first transducer, means for launching an electromagnetic wave to supply signal frequency energy to said first transducer whereby both waves impinge upon said magnesium oxide crystal, and means for applying a magnetic field to the paramagnetic ions in said magnesium oxide crystal.

3. The wave amplifier of claim 1 wherein said paramagnetic ions have an electron configuration of $d^2$, $d^4$, $d^6$ or $d^8$.

4. The wave amplifier of claim 2 wherein said paramagnetic ions have an electron configuration of $d^2$, $d^4$, $d^6$ or $d^8$.

5. The wave amplifier of claim 1 wherein said paramagnetic ions are $H_0^{3+}$.

6. The wave amplifier of claim 1 wherein said paramagnetic ions are $U^{4+}$.

7. A wave amplifier comprising a first transducer capable of converting electromagnetic energy into acoustical energy, a second transducer also capable of converting electromagnetic energy into acoustical energy, a magnesium oxide crystal interposed between said two transducers so that all three elements form a continuous medium for the passage of acoustical energy therethrough, means for launching an electromagnetic wave to supply pump frequency energy to said first transducer, means for launching an electromagnetic wave to supply signal frequency energy to said first transducer whereby both waves impinge upon said first transducer to create acoustical waves that impinge upon said magnesium oxide crystal, and means for sensing the resultant acoustical waves emanating from said magnesium oxide crystal and passing through said second transducer.

8. Means for generating two separate ultrasonic waves comprising a re-entrant cavity resonator and a non re-entrant cavity resonator, a quartz tube connected at one end to a magnesium oxide crystal, the connected portion of said quartz and magnesium oxide being in the non re-entrant cavity resonator and the free end of said quartz tube being housed in said re-entrant cavity resonator, means for launching a pulse of microwave electrical energy into said non re-entrant cavity so as to impinge at said junction between said quartz tube and said magnesium oxide whereby first acoustical waves are created in said quartz and travel along said quartz in the direction of said re-entrant cavity, means for launching a pulse of microwave electrical energy into said re-entrant cavity so as to impinge upon said free end of said quartz tube and create second acoustical waves in said quartz tube whereby the first acoustical waves are reflected from the free end of said quartz tube and proceed, along with the second acoustical waves created by said quartz housed in said re-entrant cavity, toward the junction of said quartz and magnesium oxide and through said magnesium oxide, and means for sensing the microwave electric field created at said junction by the passage of acoustical wave energy therethrough.

9. Means for generating two separate ultrasonic waves comprising a piezoelectric tube and a magnesium oxide crystal affixed to one end of said tube to form a junction, means for applying at a first time period microwave electric energy at said junction so as to create a first train of acoustical waves in said piezoelectrical crystal, means for applying microwave electrical energy, at a second time interval, to the free end of said tube so as to create a second train of acoustical waves therein at substantially the time when said first train of acoustical waves is being reflected from said free end of said tube, whereby both trains are reflected back and forth through said piezoelectric tube and said crystal, and means for detecting the electric field created in the vicinity of said junction by the passage of said reflected acoustical waves therethrough.

10. Means for generating two separate ultrasonic waves comprising a piezoelectric tube and a magnesium oxide crystal cemented at one end of said tube to form a junction, means forapplying microwave electrical energy at said junction so as to create a first train of acoustical waves in said piezoelectric crystal, means for applying microwave electrical energy at the free end of said tube so as to create a second train of acoustical waves in said piezoelectric tube.

No references cited.

ROY LAKE, *Primary Examiner.*